United States Patent [19]

Minak et al.

[11] Patent Number: 5,672,326

[45] Date of Patent: Sep. 30, 1997

[54] METHOD OF TREATING VAPORS CONTAINING AMMONIA AND HYDROGEN SULFIDE

[75] Inventors: Hans-Peter Minak, Essen; Manfred Gross, Gladbeck, both of Germany

[73] Assignee: Krupp Koppers GmbH, Essen, Germany

[21] Appl. No.: 567,228

[22] Filed: Dec. 5, 1995

[30] Foreign Application Priority Data

Jan. 16, 1995 [DE] Germany ............... 195 01 108.2

[51] Int. Cl.⁶ ................................................. B01D 53/58
[52] U.S. Cl. ........................... 423/224; 423/237; 423/564
[58] Field of Search ............................... 423/224, 226, 423/237, 564, 573.1; 201/28, 29

[56] References Cited

U.S. PATENT DOCUMENTS

| | | |
|---|---|---|
| 3,822,337 | 7/1974 | Wunderlich et al. .............. 423/224 |
| 4,041,130 | 8/1977 | Mackles ........................... 423/220 |
| 4,143,122 | 3/1979 | Laufhütte et al. ................ 423/574 R |
| 4,181,706 | 1/1980 | Choulat et al. .................... 423/237 |
| 4,273,749 | 6/1981 | Kimura et al. .................... 423/231 |
| 4,302,434 | 11/1981 | Hellmer et al. ................. 423/573 G |

FOREIGN PATENT DOCUMENTS 965488 10/1982 U.S.S.R. ........................ 423/237

*Primary Examiner*—Gary P. Straub
*Assistant Examiner*—Timothy C. Vanoy
*Attorney, Agent, or Firm*—Herbert Dubno; Jonathan Myers

[57] ABSTRACT

Ammonia and 5 to 40 volume percent hydrogen sulfide containing vapors which arise in the vaporization of process water from hydrogenation or a crude oil fraction or in gas treatment in a coking plant, can be subjected in a cracking catalyst reactor to breakdown of the ammonia to nitrogen and hydrogen. The resulting process gas is cooled to 250° to 350° C. and is fed to a hydrogenation reactor where any sulfur is hydrogenated to the hydrogen sulfide. The process gas can then be subjected to further treatment without the danger of sulfur blockage of the process lines. For example, the hydrogen sulfide can be removed by a selective absorption process.

12 Claims, 1 Drawing Sheet

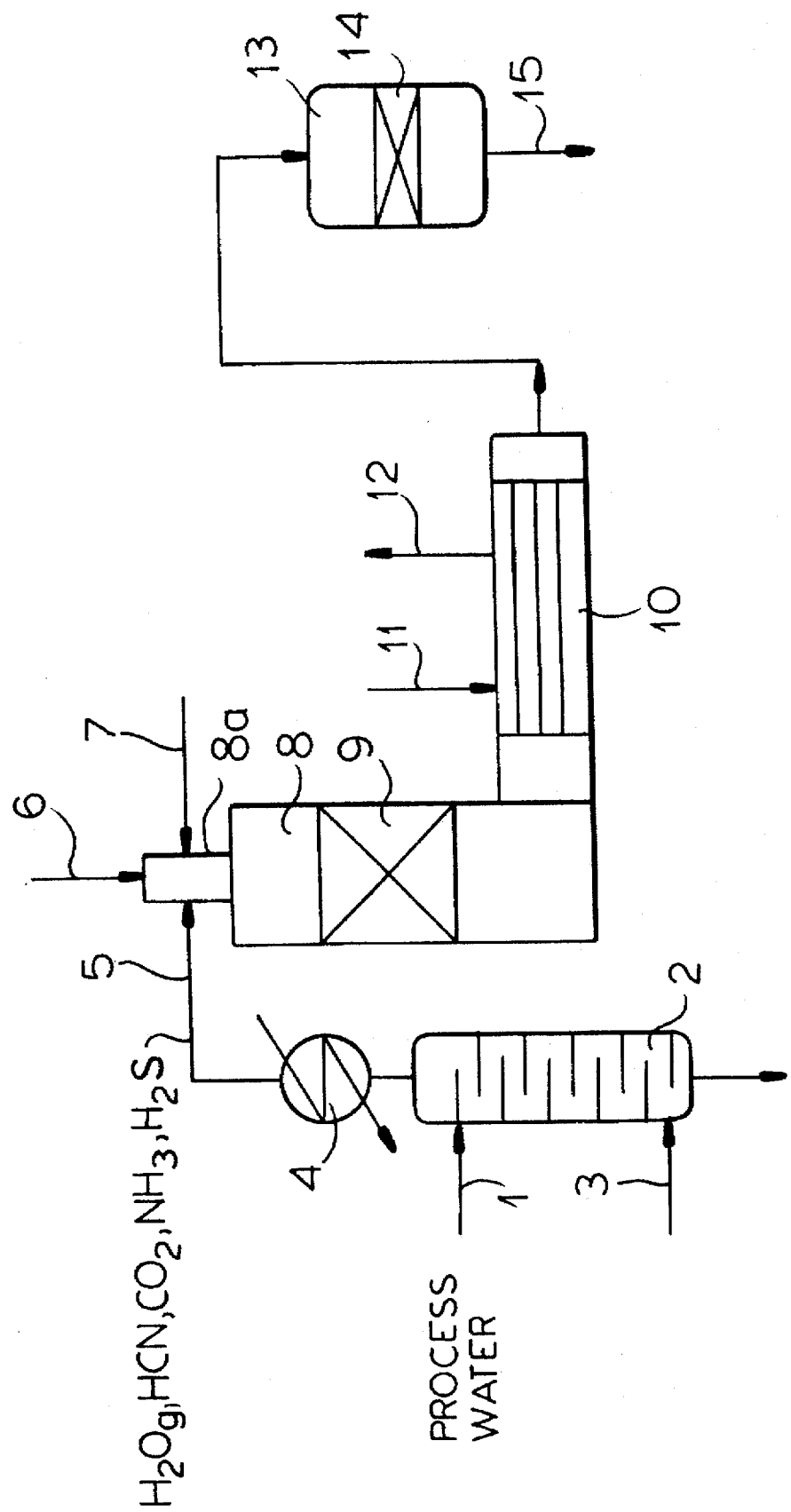

METHOD OF TREATING VAPORS CONTAINING AMMONIA AND HYDROGEN SULFIDE

FIELD OF THE INVENTION

Our present invention relates to a process for the treatment of vapors containing ammonia and hydrogen sulfide and, in particular, to the treatment of vapors as arise in the distillation of process water in the hydrogenation of crude oil fractions or in gas treatment in coking plants. The treatment is intended mainly to prevent the release of such contaminants into the atmosphere and more generally to prevent environmental hazards from arising from the release of such vapors.

BACKGROUND OF THE INVENTION

Processes for the treatment of vapors containing ammonia and hydrogen sulfide are widely known and also well known are processes especially adapted to treat vapors which arise from process water evaporation in the hydrogenation of crude oil fractions and from the gas treatment in coking plants.

In the hydrogenation of crude oil fractions and in the processing of gases in coking plants having coke ovens, process water arises which can be contaminated with toxic components like $NH_3$, $H_2S$ and HCN. Prior to the further cleaning of these process waters in biological waste-water treatment plants or prior to recycling them to other technological process stages, the process water may be subjected to distillation which, in the field, is generally known as acid water stripping. The toxic components are recovered in this process in a vapor which can be more or less saturated with water vapor depending upon the temperature of the dephlegmator. Before a further treatment of these vapors is carried out, the toxic components must be converted into nontoxic substances. Depending upon the character of the refinery or coking plant and the raw materials used therein, the vapors of the acid water stripping may contain different concentrations of $NH_3$, $H_2S$, HCN, $CO_2$, organic sulfur compounds and hydrocarbons which precludes any single process from being employed to protect the environment from release of the contaminants.

With low $NH_3$ content and high $H_2S$ content, the vapors can be processed in a Claus plant in which the $H_2S$ is converted to elemental sulfur (which in turn is utilized for the production of sulfuric acid). With high $NH_3$ content and low $H_2S$ content, a catalytic $NH_3$ cracking is effected with selective decomposition of the $NH_3$ and HCN which may be present with only a minimum formation of sulfur. With $NH_3$ concentrations greater than 20% and comparatively high $H_2S$ content in the range of 5 to 40 volume percent in the dry vapor, $NH_3$ and HCN cannot be decomposed selectively apart from $H_2S$ and thus large amounts of sulfur (in excess of 100 ppm) in the form of $S_6$ and $S_8$ are obtained so that a further processing of the process gases must be carried out at temperatures above the solidification point of the sulfur to prevent blockages in the apparatus and thus the earlier process does not permit continuous process operation in most cases.

OBJECTS OF THE INVENTION

It is, therefore, the principal object of the present invention to provide an improved process for the treatment of vapors which contain ammonia and hydrogen sulfide which will yield a valuable process gas and can be carried out continuously without interruption by the deposition of elemental sulfur.

Another object of the invention is to provide an improved process for treating vapors containing ammonia and hydrogen sulfide as are produced from evaporation from process water from the hydrogenation of crude oil fractions or from the processing of gases in coking plants whereby drawbacks of earlier systems are avoided.

SUMMARY OF THE INVENTION

These objects and others which will become apparent hereinafter are attained, in accordance with the invention, in a process for the treatment of vapors containing ammonia and from 5 to 40 volume percent hydrogen sulfide, and especially for the treatment of vapors which arise form the distillation of process water from hydrogenation of crude oil fractions or in the gas treatment in coking plants.

According to the invention, the vapors initially are fed to a cracking furnace which is operated with a temperature in the range of 1000° to 1200° C. and a reducing atmosphere to produce a process gas and in which the development of elemental sulfur from the hydrogen sulfide in the vapor is tolerated.

The process gas which thus results is fed through a cracking catalyst and the ammonia is thereby cracked to form a hydrogen/nitrogen mixture in the process gas. The latter containing the cracked ammonia is cooled to a temperature in the range of 250° to 350° C. and the cooled process gas is fed to a hydrogenation reactor and the sulfur contained therein is reacted to hydrogen sulfide.

The process gas leaving the hydrogenation reactor is subjected to further processing. In a preferred embodiment of the invention, the cooled process gas in the hydrogenation reactor is brought into contact with a hydrogenation catalyst. The hydrogenated process gas can be subjected to a selective absorption process thereby removing the hydrogen sulfide from the process gas.

Catalysts which are suitable for the ammonia splitting and the hydrogenation are known and, in the case of the ammonia-cracking catalyst, can be nickel catalysts and/or iron catalysts and/or nickel/iron catalysts. The hydrogenation catalyst can be a catalyst as selected from the group which consists of ruthenium, platinum, nickel, cobalt, mixtures thereof or oxidic hydrogenation contact catalysts.

The system of the invention allows a catalytic ammonia cracking or splitting to be carried out even in the case of acid water stripper vapors which can have a hydrogen sulfide content of 5 to 40 volume percent in a continuous manner since the ammonia cracking is not hindered by a condensation or solidification of elemental sulfur. Any elemental sulfur which is present is converted back to the hydrogen sulfide.

A process for treating vapor-containing ammonia and 5 to 40% by volume hydrogen sulfide can comprise:
 (a) introducing a vapor containing ammonia and 5 to 40 percent by volume hydrogen sulfide into a cracking furnace and cracking the vapor therein at a temperature of substantially 1000° to 1200° C. in a reducing atmosphere to produce elemental sulfur from the hydrogen sulfide and a process gas;
 (b) feeding the process gas to a cracking catalyst and converting ammonia in the process gas to a hydrogen/nitrogen mixture in the process gas;
 (c) thereafter cooling the process gas with the hydrogen/nitrogen mixture therein to a temperature in a range of 150° to 350° C. to form a cooled process gas;

(d) hydrogenating sulfur in the cooled process gas in a hydrogenation reactor to form hydrogen sulfide from the sulfur and in the process gas; and (e) recovering a process gas containing hydrogen sulfide from the hydrogenation reactor.

BRIEF DESCRIPTION OF THE DRAWING

The above and other objects, features, and advantages will become more readily apparent from the following description, reference being made to the sole FIGURE of which is a flow diagram illustrating the process of the invention.

SPECIFIC DESCRIPTION

Process water contaminated with $NH_3$, $H_2S$ and other contaminants is fed at 1 to an acid water stripper 2 in which the volatile components like $NH_3$, $H_2S$, $CO_2$, HCN, organic sulfur compounds and hydrocarbons are stripped out and passed through a dephlegmator which separates liquid water form the vapor phase and establishes the vapor temperature. The dephlegmator 4 is cooled by cooling water. Preferably the vapor phase at 5 has a temperature of 60° to 90° C. since a higher proportion of water vapor in the gases leaving the dephlegmator suppresses salting out in the vapor lines and on burner parts and reduces soot formation in the subsequent cracking reactor 8.

By way of example, the vapor phase in line 5 can have approximately the following composition:

| | |
|---|---|
| $NH_3$ | 13.2 kmol/h |
| $H_2S$ | 5.0 kmol/h |
| R-SH | 0.5 kmol/h |
| HCN | 0.1 kmol/h |
| $H_2O$ | 13.3 kmol/h |

The vapor phase together with a heating gas introduced at 6 and a combustion air is fed to the burner 8a of a cracking reactor 8 in which, by combustion with heating gas, a reducing atmosphere is established in the combustion chamber and the process gas can be brought to a temperature of say 1200° C. with approximately 7 kmol/h of a fuel gas with a heating value of 550 MJ/kmol is burned with 43 kmol per hour of air.

The process gas passes from the combustion chamber of the cracking reactor 8 over the cracking catalyst 9 in which the following reactions occur:

$$2\ NH_3 \rightarrow N_2 + 3\ H_2 \tag{1}$$

$$2\ HCN + 2\ H_2O \rightarrow 2\ CO + N_2 + 3\ H_2 \tag{2}$$

The process gas after the cracking catalyzer 9 has approximately the following composition:

| | | |
|---|---|---|
| $H_2S$ | 5.65 | Vol.–% |
| $H_2$ | 16.95 | Vol.–% |
| $N_2$ + Ar | 45.1 | Vol.–% |
| CO | 3.0 | Vol.–% |
| $CO_2$ | 2.8 | Vol.–% |
| $H_2O$ | 26.5 | Vol.–% |

Part of the $H_2S$ in the gases entering the cracking furnace 8 are converted to elemental sulfur usually in the forms of $S_6$ and $S_8$ by the reaction:

$$x(H_2S) \rightarrow xH_2 + S_x \tag{3}$$

, where x is 6 or 8. In further side reactions under the reducing conditions in the combustion chamber of the cracking furnace 8, any sulfur dioxide present in the ppm range can be converted in the presence of an excess of $H_2S$ in the process gas to sulfur in accordance with the reaction:

$$x(2\ H_2S + SO_2) \rightarrow S_x + 2 \times H_2O \tag{4}$$

where, again x is usually 6 or 8.

In the specific example to which the gas compositions relate, the concentration of $S_6$ plus $S_8$ in the gas is about 120 parts per million which corresponds to about 3 kg/h of elemental sulfur for the total process gas quantity. This could lead to blockage in subsequent processing stages at temperatures below 115° C. The process gas is indirectly cooled in the waste heat boiler 10 to 300° C. with the boiler feed water at 11 being converted to steam at 12. At this temperature, the process gas is fed to a hydrogenation reactor 13 in which the hydrogen generated in accordance with equations 1 and 2 is used to hydrogenate the elemental sulfur $S_6$ plus $S_8$ on the hydrogenation catalyst 14 to $H_2S$ in accordance with the equation.

$$xH_2 + S_x \longrightarrow xH_2S \tag{5}$$

The process gas traversing the hydrogenation reactor contains elemental sulfur in a concentration of less than 1 pmm and can be subjected to further processing without concern about sulfur blockage. The subsequent process steps at 15 can include, for example, a selective $H_2S$ absorption, a quenching process or a mixture with other gases.

The invention has the advantage that the steam generated by the indirect cooling of the process gas can be used within the plant or elsewhere. The absorption process can be carried out utilizing the heat of the process gas. In the invention, moreover, the hydrogenated process gas can be fed to some other process gas stream for common processing at the temperature at which the hydrogenated process gas is obtained or after directed or indirect cooling thereof.

We claim:

1. A process for continuously treating vapor containing ammonia and 5 to 40 percent by volume hydrogen sulfide, without interruption by deposition of elemental sulfur, said process consisting essentially of the steps of:

(a) introducing a vapor containing ammonia and 5 to 40 percent by volume hydrogen sulfide into a cracking furnace at a temperature of substantially 1000° to 1200° C. in a reducing atmosphere to produce a process gas containing ammonia and elemental sulfur, said elemental sulfur deliberately retained as vapor in said process gas;

(b) feeding said process gas to a cracking catalyst and converting the ammonia in said process gas to a hydrogen/nitrogen mixture in said process gas;

(c) thereafter cooling said process gas from step (b) with said elemental sulfur and said hydrogen/nitrogen mixture therein to a temperature in a range of 250° C. to 350° C. to form a cooled process gas;

(d) passing the gas from step (c) containing all the sulfur formed in step (a) to a hydrogenation zone, hydrogenating the sulfur with hydrogen formed in step (b) to convert all the sulfur in the process gas to hydrogen sulfide; and (e) recovering a process gas containing hydrogen sulfide from said hydrogenation reactor.

2. The process defined in claim 1 wherein said cooled process gas is contacted with a hydrogenation catalyst in said hydrogenation reactor.

3. The process defined in claim 2 wherein said process gas from step (e) containing hydrogen sulfide is subjected to a selective absorption for removal of hydrogen sulfide therefrom.

4. The process defined in claim 3 wherein said cracking catalyst contains a member selected from the group which consists of nickel, iron and nickel/iron.

5. The process defined in claim 4 wherein said hydrogenation catalyst contains a member selected from the group which consists of ruthenium, platinum, nickel, cobalt, copper, mixtures thereof and oxides thereof.

6. The process defined in claim 5 wherein said vapor derives from distillation of process water produced in the hydrogenation of a crude oil fraction.

7. The process defined in claim 5 wherein said vapor derives from treatment of coke-oven gases.

8. The process defined in claim 1 wherein said process gas from step (e) containing hydrogen sulfide is subjected to a selective absorption for removal of hydrogen sulfide therefrom.

9. The process defined in claim 1 wherein said cracking catalyst contains a member selected from the group which consists of nickel, iron and nickel/iron.

10. The process defined in claim 1 wherein said hydrogenation catalyst contains a member selected from the group which consists of ruthenium, platinum, nickel, cobalt, copper, mixtures thereof and oxides thereof.

11. The process defined in claim 1 wherein said vapor derives from distillation of process water produced in the hydrogenation of a crude oil fraction.

12. The process defined in claim 1 wherein said vapor derives from treatment of coke-oven gases.

* * * * *